US008225316B1

(12) United States Patent
Bunnell et al.

(10) Patent No.: US 8,225,316 B1
(45) Date of Patent: Jul. 17, 2012

(54) METHODS AND SYSTEMS FOR CREATING AND APPLYING PATCHES FOR VIRTUALIZED APPLICATIONS

(75) Inventors: Karl Bunnell, Highland, UT (US); Randall R. Cook, Mapleton, UT (US); Jeremy Hurren, Pleasant Gove, UT (US)

(73) Assignee: Symantec Corporation, Mountain View, CA (US)

( * ) Notice: Subject to any disclaimer, the term of this patent is extended or adjusted under 35 U.S.C. 154(b) by 828 days.

(21) Appl. No.: 12/369,512

(22) Filed: Feb. 11, 2009

(51) Int. Cl.
G06F 9/455 (2006.01)
G06F 9/46 (2006.01)
(52) U.S. Cl. .......................... 718/1; 718/100
(58) Field of Classification Search .............. None
See application file for complete search history.

(56) References Cited

U.S. PATENT DOCUMENTS

| 7,461,086 B1* | 12/2008 | Hurren et al. ............... 1/1 |
| 7,461,096 B1* | 12/2008 | Hurren et al. ............... 1/1 |
| 7,934,256 B2* | 4/2011 | Matsushima et al. ........ 726/22 |
| 2006/0085860 A1* | 4/2006 | Zou et al. .................... 726/26 |
| 2007/0226782 A1* | 9/2007 | Sato et al. ................... 726/4 |

OTHER PUBLICATIONS

U.S. Appl. No. 12/371,116, filed Feb. 13, 2009, Bunnell, Karl.
"VMware ThinApp: Deploy and run applications without conflict"; (accessed May 14, 2009); http://www.vmware.com/files/pdf/thinapp_datasheet.pdf.

* cited by examiner

Primary Examiner — Corey S Faherty
(74) Attorney, Agent, or Firm — Advantedge Law Group

(57) ABSTRACT

A method may include identifying a first version of a virtualized application. The first version of the virtualized application may include a first read-only virtualization sublayer, and the first read-only virtualization sublayer may provide a base state of the first version of the virtualized application. The method may also include identifying a second version of the virtualized application. The second version of the virtualized application may include a second read-only virtualization sublayer, which may provide a base state of the second version of the virtualized application. The method may further include determining a difference between the first read-only virtualization sublayer and the second read-only virtualization sublayer and using the difference to create a patch configured to update an instance of the first version of the virtualized application to an instance of the second version of the virtualized application. Various other methods, systems, and computer-readable media are also disclosed.

20 Claims, 10 Drawing Sheets

METHODS AND SYSTEMS FOR CREATING AND APPLYING PATCHES FOR VIRTUALIZED APPLICATIONS

BACKGROUND

Information technology (IT) administrators may spend a substantial amount of time managing software applications. Managing software applications may include resolving application conflicts, repairing damaged applications, migrating to new versions of applications, installing applications, and patching applications. These tasks may be frustrating and time-consuming.

Application virtualization technologies may simplify many IT administration tasks. For example, application virtualization may allow an administrator to turn on or off a user's access to applications and data, which may reduce the time it takes to provide users with the resources they need. Application virtualization may also allow an administrator to reset broken applications to a known-good state without fear of damaging other applications. Application virtualization may ensure that each virtualized application has its own copy of DLL files that it would normally share with other applications. This eliminates conflicts that occur when two or more applications may require different versions of the same DLL, thereby rescuing administrators from a condition commonly referred to as "DLL Hell."

Application virtualization may allow different versions of the same application to peacefully coexist. This means that an administrator may keep older versions intact and available while testing new versions. Even after migrating to a new version, an administrator may quickly rollback to the previous version at any time.

Despite the numerous advantages of application virtualization, updating installed virtualized applications may result in significant productivity losses and resource consumption. For example, traditional application virtualization technologies may create and deploy an entire updated application for each application update. For large applications, the administration time, bandwidth, and file system requirements of deploying a small update may be comparable to deploying the entire application anew.

SUMMARY

The instant disclosure is directed to methods and systems for creating and applying patches to virtualized applications. In some embodiments, a patch-creation module may determine the difference between read-only sublayers of first and second versions of a virtualized application to provide a patch that represents the difference between the two read-only sublayers. For example, the patch-creation module may identify a first version of a virtualized application, which may include a first read-only virtualization sublayer. The patch-creation module may identify a second version of the virtualized application, which may include a second read-only virtualization sublayer. The patch-creation module may determine a difference between the first read-only virtualization sublayer and the second read-only virtualization sublayer and may use the difference to create a patch.

The patch may be configured to update an instance of the first version of the virtualized application to an instance of the second version of the virtualized application. In some embodiments, the patch may be applied to an instance of the first version of the virtualized application to create an in-place instance of the second version of the virtualized application. In other embodiments, the patch may be applied by creating a new virtualization layer, copying the read-only layer of the instance of the first version of the virtualized application to the new virtualization layer, and applying the patch to the new virtualization layer.

In some embodiments, the patch may be deployed to one or more remote computing devices. In various embodiments, the difference between the first read-only virtualization sublayer and the second read-only virtualization sublayer may include a binary differential between the first read-only virtualization sublayer and the second read-only virtualization sublayer. The instant disclosure also includes various other embodiments, alternatives, and examples for creating and applying patches for virtualized applications. Features from any of the above-mentioned embodiments may be used in combination with one another in accordance with the general principles described herein.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
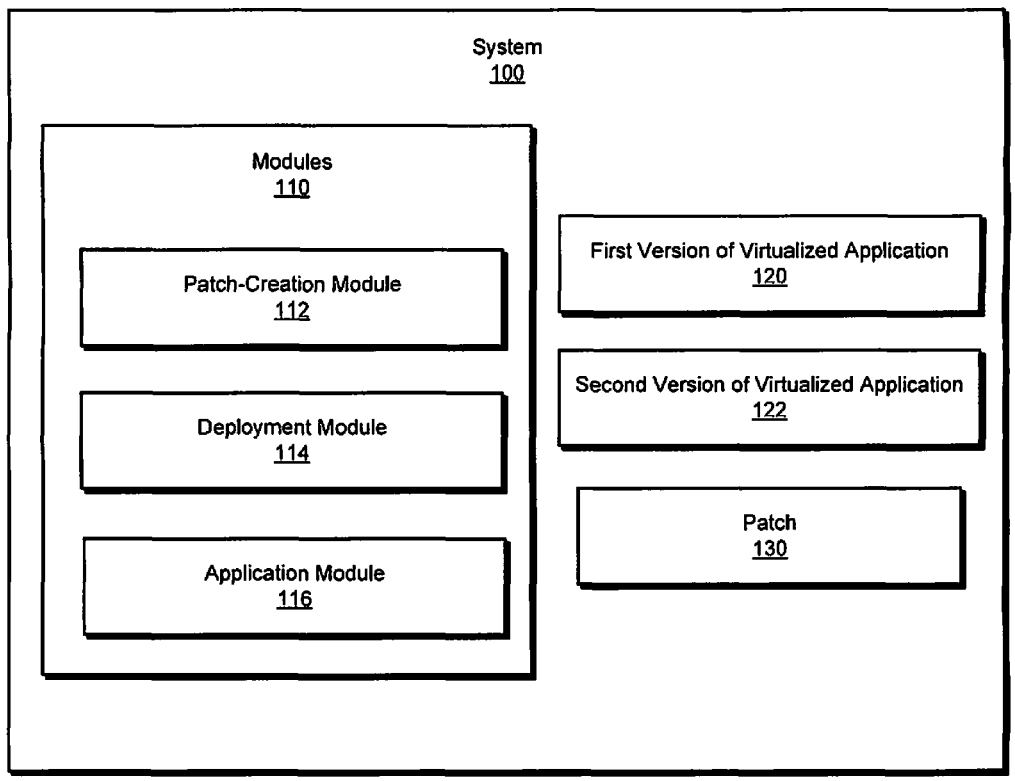
FIG. 1 is a block diagram of an exemplary system for creating and applying patches for virtualized applications according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for creating and applying patches for virtualized applications. Various embodiments may leverage the characteristics of virtualization technologies that provide read-only and read-write sublayers for virtualized applications. In such technologies, a read-only sublayer may provide a base state for a virtualized application and a read-write layer may capture changes to the base state. In some embodiments, the read-only layer of one version of an application may be compared with the read-only layer of another version of the application to create a patch.

For example, a patch-creation module may determine a difference between read-only virtualization sublayers of first and second versions of a virtualized application. The patch-creation module may use the difference to create a patch configured to update an instance of the first version of the virtualized application to an instance of the second version of the virtualized application. The patch may be applied to instances of the first version of the virtualized application in-place, in a new virtualization layer, or in any other suitable manner.

Embodiments of the present disclosure may provide various features and advantages not provided by traditional technologies. For example, virtualized application patches disclosed herein may be relatively small because they may include only the changes made in an application update. Thus, administrators may be able to update virtualized applications by deploying a patch instead of deploying an entire updated application. Embodiments disclosed herein may mitigate losses in productivity and resource utilization associated with deploying an entire updated application. These and other embodiments, features, advantages will be more fully understood upon reading the following detailed description in conjunction with the accompanying drawings and claims.

Figure 2:
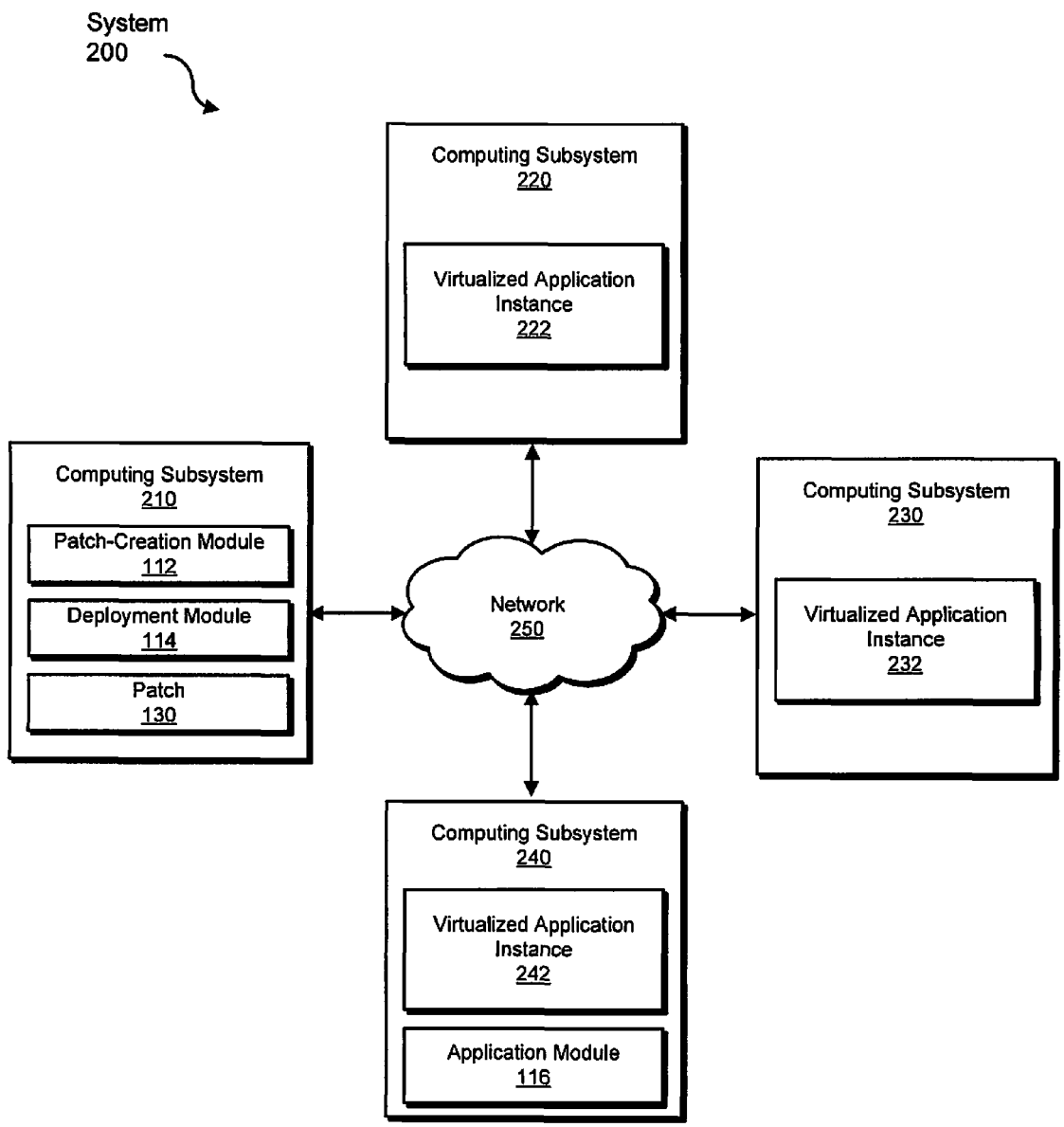
FIG. 2 is a block diagram of another exemplary system for creating and applying patches for virtualized applications according to certain embodiments.
Figure 3:
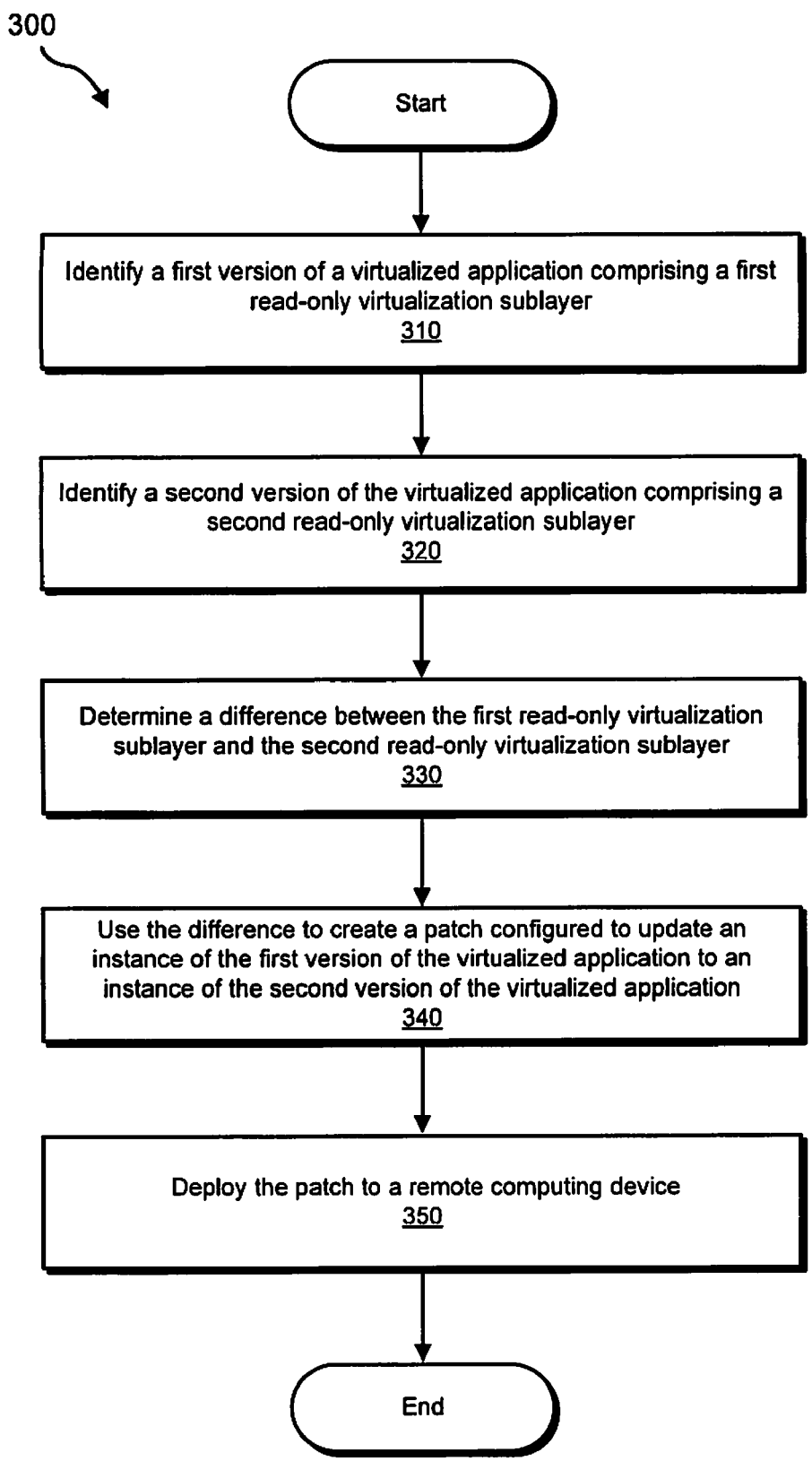
FIG. 3 is a flow diagram of an exemplary method for creating patches for virtualized applications according to certain embodiments.
Figure 4:
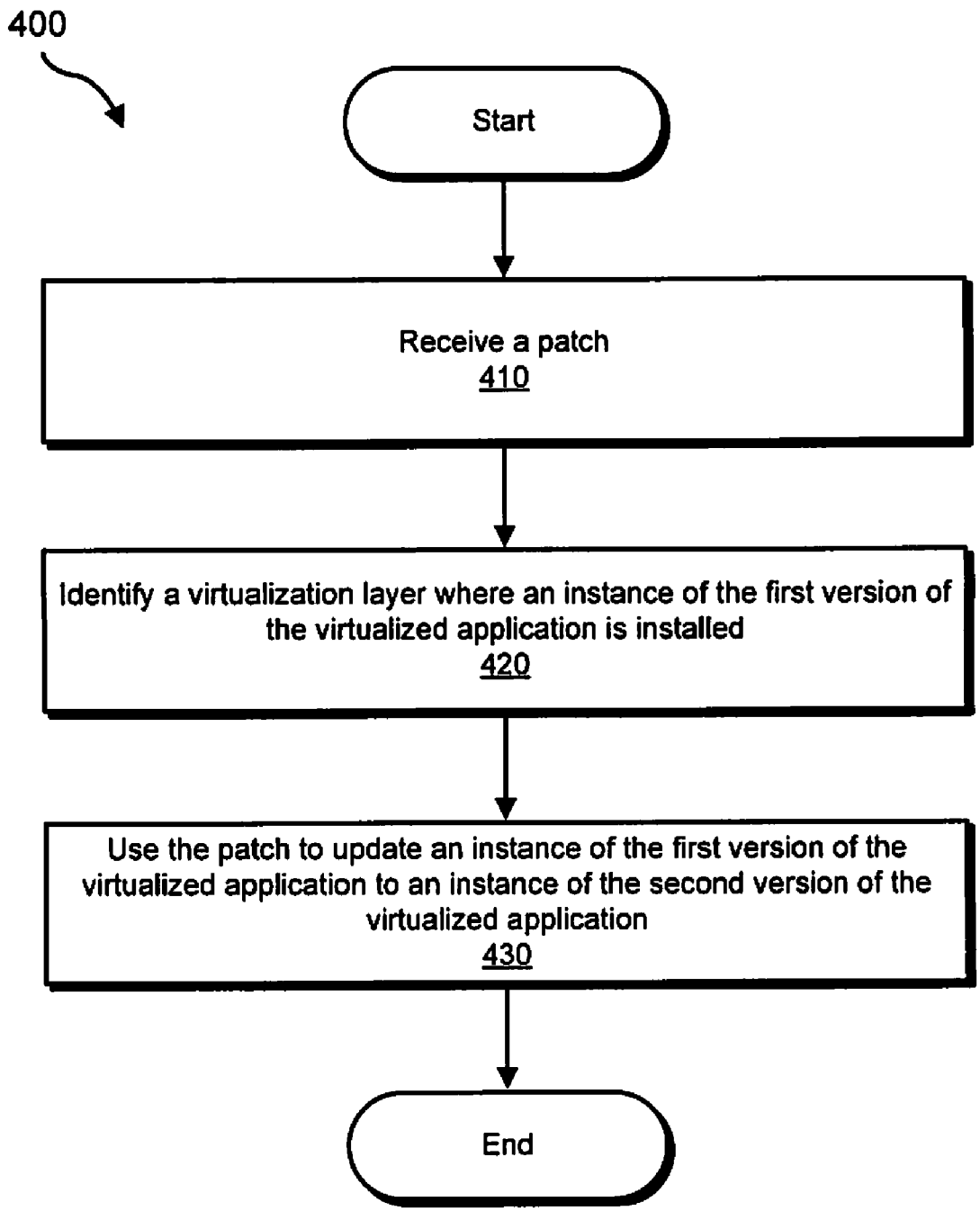
FIG. 4 is a flow diagram of an exemplary method for applying patches to virtualized applications according to certain embodiments.
Figure 9:
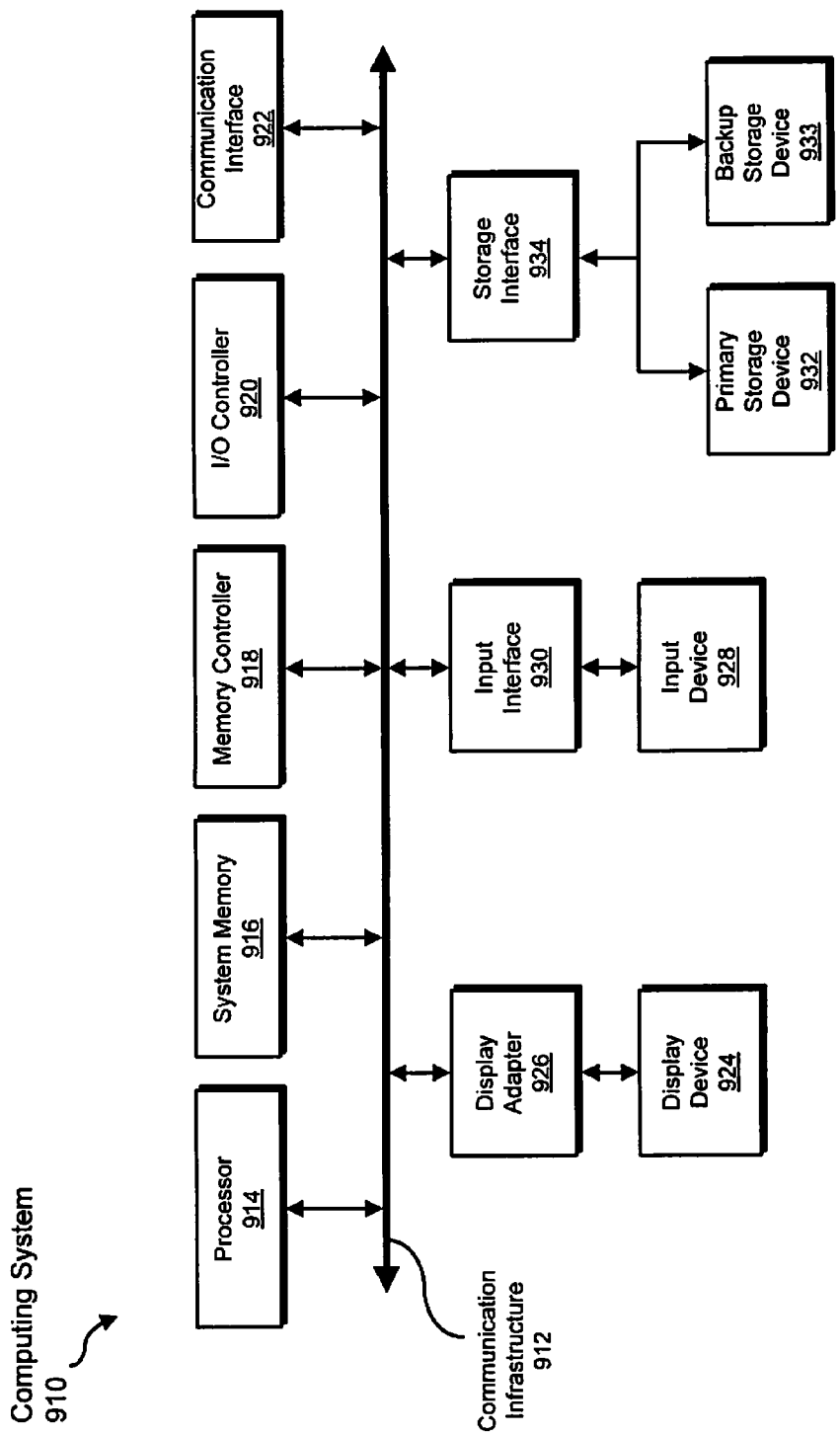
FIG. 9 is a block diagram of an exemplary computing system capable of implementing one or more of the embodiments described and/or illustrated herein.
Figure 10:
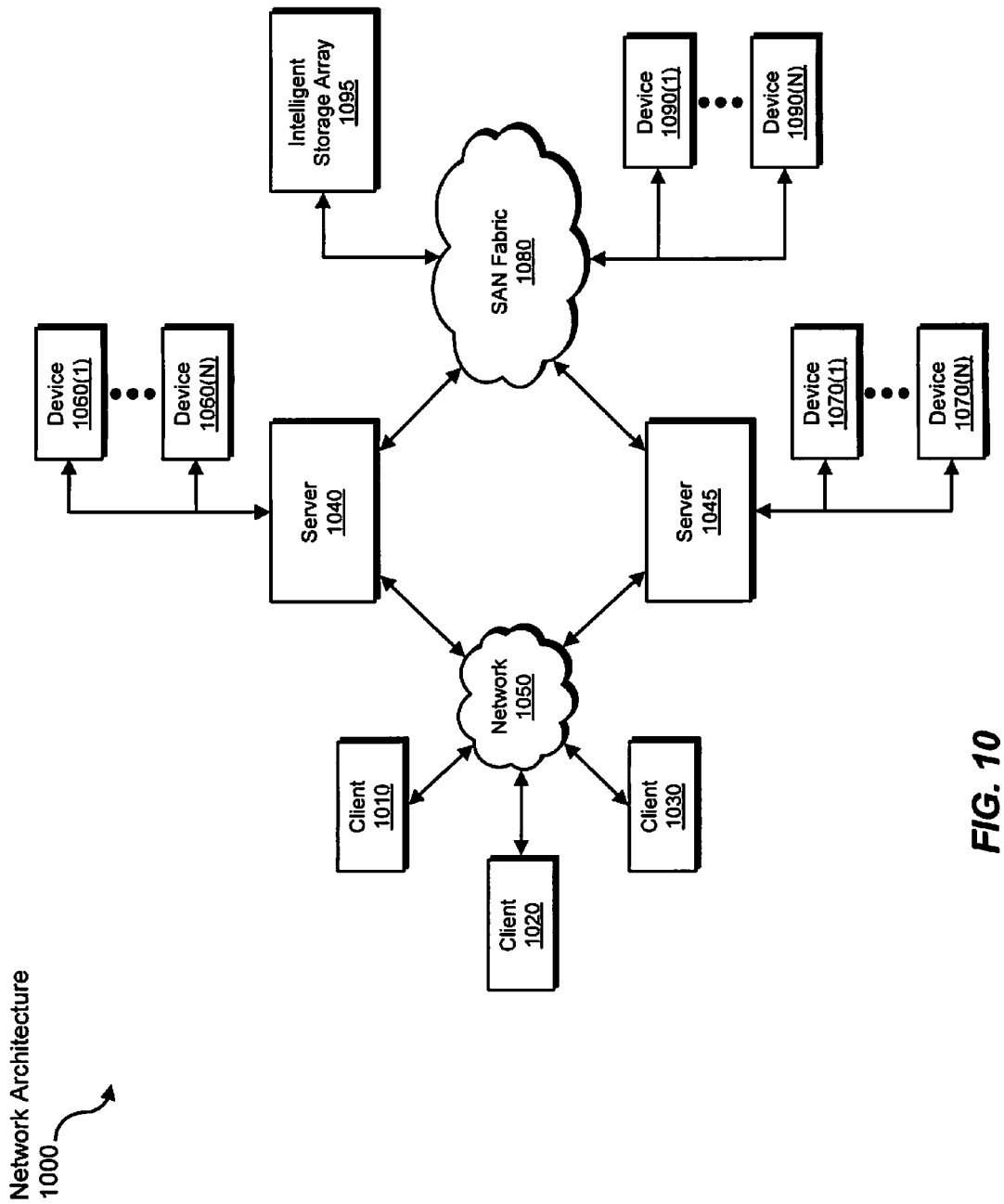
FIG. 10 is a block diagram of an exemplary computing network capable of implementing one or more of the embodiments described and/or illustrated herein.

FIGS. 1 and 2 show exemplary systems for creating and apply patches to virtualized applications, and FIGS. 3 and 4 show methods for accomplishing the same. FIGS. 5-8 show various application layering technologies, and FIGS. 9 and 10 illustrate an exemplary computing system and network architecture for implementing embodiments of the instant disclosure.

FIG. 1 illustrates an exemplary system 100 for creating and applying patches to virtualized applications. System 100 may include modules 110, a first version of a virtualized application 120, a second version of the virtualized application 122, and a patch 130. Modules 110 may include a patch-creation module 112, a deployment module 114, and an application module 116. Patch-creation module 112 may be programmed to identify first and second versions of a virtualized application. Patch-creation module 112 may also be programmed to determine the difference between read-only virtualization sublayers of the first and second versions of the virtualized application and to use the difference between the read-only virtualization sublayers to create a patch. Deployment module 114 may be programmed to deploy the patch to a remote computing device, and application module 116 may be programmed to use the patch to update an instance of the first version of the virtualized application.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more tasks associated with steps disclosed herein.

As previously mentioned, system 100 may include a first version of a virtualized application 120 and a second version of the virtualized application 122. The first version of the virtualized application 120 may include any application installed in a virtualization layer. The second version of the virtualized application 122 may represent the first version of the virtualized application 120 with an update or other modification applied. Various examples of virtualization layers and virtualized applications are provided in the discussion corresponding to FIGS. 5-8.

System 100 may also include patch 130. Patch 130 may represent and/or include any difference between the first version of the virtualized application 120 and the second version of the virtualized application 122. For example, patch 130 may include a binary differential between the first version of the virtualized application 120 and the section version of the virtualized application 122. As described in greater detail below, patch 130 may be created by determining the difference between the first version of the virtualized application 120 and the second version of the virtualized application 122.

FIG. 2 is a block diagram of an exemplary system 200 for creating and applying patches for virtualized applications. Exemplary system 200 may include a computing subsystem 210, a computing subsystem 220, a computing subsystem 230, a computing subsystem 240, and a network 250. Computing subsystems 210, 220, 230, and 240 may include or be implemented as hardware, computing instructions (e.g., software), or a combination thereof. For example, computing subsystem 210 may include an administrator's computer, and computing subsystems 220, 230, and 240 may include end-user computing devices in an enterprise environment. In some embodiments, one or more of computing subsystems 210, 220, 230, 240 may include a desktop computer, a laptop computer, a portable-computing device, a workstation, a server, and/or any other suitable computing device.

As shown in FIG. 2, computing system 210 may include patch-creation module 112, deployment module 114, and patch 130. Computing subsystems 220, 230, and 240 may each include an instance of a first version of a virtualized application. For example, computing subsystem 220 may include a virtualized application instance 222, computing subsystem 230 may include a virtualized application instance 232, and computing subsystem 240 may include a virtualized application instance 242. Computing subsystem 240 may also include application module 116.

Computing subsystems 210, 220, 230, and 240 may communicate over a network 250. Network 250 generally represents any medium or architecture capable of facilitating communications or data transfer. Network 250 may include, without limitation, the Internet, a Wide Area Network (WAN), a Local Area Network (LAN), a Personal Area Network (PAN), the Internet, Power Line Communications (PLC), a cellular network (e.g., a GSM network), or the like. Network 250 may facilitate communication or data transfer using wireless and/or wired communications.

FIG. 3 illustrates an exemplary method 300 for creating patches for virtualized applications. The steps in FIG. 3 may be performed by one or more components of system 100 and/or system 200. For example, at step 310 patch-creation module 112 may identify the first version of the virtualized application 120. The first version of the virtualized application 120 may include a first read-only virtualization sublayer. At step 320, patch-creation module 112 may identify the second version of the virtualized application 122. The second version of the virtualized application 122 may include a second read-only virtualization sublayer.

Patch-creation module 112 may identify the first and second versions of the virtualized application 120 and 122 in any suitable manner. For example, patch-creation module 112 may identify the first and second versions of the virtualized application 120 and 122 by locating them on a hard drive, receiving them from another module, and/or receiving them from a remote computing device. In some embodiments, patch-creation module 112 may create the second version of virtualized application 122 by applying an update or other modification to the first version of the virtualized application 120.

Returning to FIG. 3, at step 330 patch-creation module 112 may determine the difference between the first read-only virtualization sublayer (i.e., the read-only sublayer of the first version of the virtualized application 120) and the second read-only virtualization sublayer (i.e., the read-only sublayer of the second version of the virtualized application 122). Patch-creation module 112 may determine the difference between the first and second read-only sublayers in any suitable manner. For example, patch-creation module 122 may determine the difference between the first and second read-only sublayers by scanning the first and second read-only sublayers to identify files in the sublayers. Patch-creation module 122 may then compare files in the first read-only sublayer with files in the second read-only sublayer. In some embodiments, determining the difference between the first and second read-only sublayers may include comparing a registry area in the first read-only sublayer to a registry area in the second read-only sublayer.

In some embodiments, patch-creation module 122 may determine the difference between the first and second read-only virtualization sublayers by creating a binary differential (i.e., a binary delta) between the first read-only virtualization sublayer and the second read-only virtualization sublayer. A binary differential between the first read-only virtualization sublayer and the second read-only virtualization sublayer may be created by generating the difference between registry and/or file system redirection areas of the read-only sublayers of the first and second versions of the virtualized application 120 and 122.

After determining the difference between the first and second read-only virtualization sublayers, at step 340 patch-creation module 122 may use the difference to create a patch configured to update an instance of the first version of the virtualized application to an instance of the second version of the virtualized application. Patch-creation module 122 may create the patch in any suitable manner. For example, patch-creation module 122 may create the patch by compressing the difference between the read-only sublayers into a Virtual Patch Archive (VPA). The patch may also be formatted and/or packaged using any other formatting and/or packaging technologies.

At step 350, deployment module 114 may deploy the patch to a remote computing device. In some embodiments, deployment module 114 may deploy the patch to two or more remote computing devices. The patch may be deployed using any suitable deployment and/or transmission technologies. In some embodiments, instead of being deployed to a remote computing device, the patch may be used to update or otherwise modify a local virtualized application.

FIG. 4 shows an exemplary method 400 for applying a patch to a virtualized application. The steps shown in FIG. 4 may be performed by any suitable computer-executable code and/or computing system. In some embodiments, the steps shown in FIG. 4 may be performed by one or more of patch-creation module 112, deployment module 114, and/or application module 116. For example, at step 410, application module 116 may receive a patch. Application module 116 may receive the patch from another module, a remote computing device, and/or any other source. In some embodiments, application module 116 may receive the patch by identifying or otherwise accessing the patch.

At step 420, application module 116 may identify a virtualization layer where an instance of the first version of the virtualized application is installed. The virtualization layer may include a read-only sublayer and a read-write sublayer. A read-only sublayer, which is also referred to herein as a read-only virtualization sublayer, may include any sublayer that one or more users is prohibited from modifying. For example, a read-only sublayer may include a sublayer that may only be modified by an administrator. A read-only sublayer may provide a base state for an application installation. In contrast, a read-write sublayer may be configured to capture application changes made by users who are prohibited from modifying the read-only sublayer.

At step 430, application module 116 may use the patch to update an instance of the first version of the virtualized application. An instance of a first version of a virtualized application may include any installation or copy of the first version of the virtualized application. Application module 116 may update the instance of the first version of, the virtualized application to an instance of a second version of the virtualized application by applying the patch to the instance of the first version of the virtualized application. Generally, an instance of a first version of an application may referred to as being updated to an instance of a second version of an application when the instance of the first version of the application is modified to include features and/or other changes found in the second version of the application that are not found in the first version of the application.

Application module 116 may update the instance of the first version of the virtualized application in any suitable manner. For example, application module 116 may identify a virtualization layer where an instance of the first version of the virtualized application is installed. Then, application module 116 may use the patch to modify a read-only sublayer of the virtualization layer. Such embodiments may be referred to as "in-place" updates or modifications. In other embodiments, application module 116 may create a new virtualization layer and copy one or more files and/or settings from the read-only sublayer of the original virtualization layer to a read-only sublayer of the new virtualization layer. Application module 116 may use the patch to update the read-only sublayer in the new virtualization layer, thereby leaving the instance of the first version of the virtualized application in the original virtualization layer and creating an instance of the second version of the virtualized application in the new virtualization layer.

In some embodiments, application module 116 may function by prompting a user to select a patch and may automatically determine which virtualized layer the patch should be applied to. In other embodiments, application module 116 may query a user about which virtualization layer (i.e., virtualized application) a patch should be applied to. Application module 116 may additionally query a user regarding whether to apply the patch "in-place" to a layer or create a new layer for the patch.

The following discussion provides an example of how the methods shown in FIGS. 3 and 4 may be implemented by components of systems 100 and 200. An administrator using computing subsystem 210 may want to apply an update (e.g., a security update from a vendor, a bug fix, new features, or any other modification for an application) to virtualized applications instances 222, 232, and 242. The administrator may use patch-creation module 112 to create patch 130, which may represent the difference between virtualized application instances 222, 232, and 242 and an updated virtualized application instance (i.e., an application instance to which the update has been applied). Patch-creation module 112 may create the patch using the process presented in FIG. 3. The administrator may then use deployment module 114 to deploy patch 130 to computing subsystems 220, 230, and 240.

Patch 130 may be applied to virtualized application instances 222, 232, and 242 using the process presented in FIG. 4. In some embodiments, patch 130 may include code programmed to automatically perform one or more of the steps shown in FIG. 4. Additionally or alternatively, code external to patch 130 may perform one or more of the steps shown in FIG. 4. For example, application module 116 may apply patch 130 to virtualized application instance 242.

Figure 5:
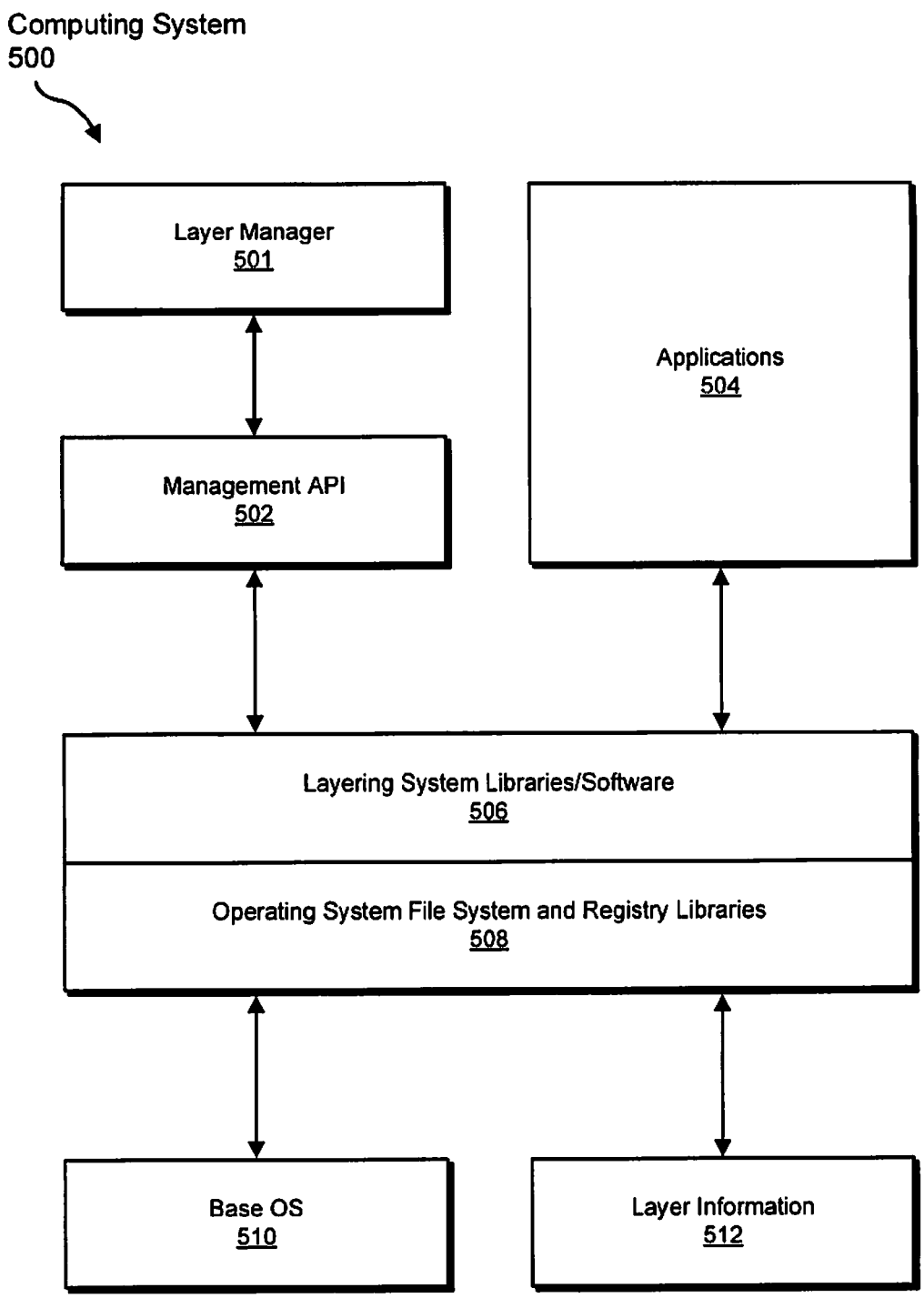
FIG. 5 is a block diagram of exemplary components of a conceptual level of a computing system configured to provide application virtualization according to certain embodiments.

FIGS. 5-8 provide examples of virtualization technologies and virtualized applications to which the patch creation and application embodiments described herein may be applied. FIG. 5 shows a conceptual organization of components of a computing system 500 with a virtualization layer. A base operating system 510 may form a platform with which applications may be executed and from which files may be accessed in file systems. Base operating system 510 may include registry settings, which may be globally available to applications for reading and writing. Computing system 500 may include libraries 508 for executing the functions of the operating system. Libraries 508 may include operating system files and registry entries. Layering system libraries and software 506 may be tied to libraries 508. Layering system libraries and software 506 may interpret file system and registry accesses from applications 504. The layering system software 506 may perform computations to determine whether the access should be permitted to continue to base operating system 510 or should be redirected to layer information 512. Layer information 512 may include information relating to the contents of files and registry settings. Layer manager 501 may control configuration of layering system software 506 through a management Application Programming Interface (API) 502.

As previously mentioned, in some application-virtualization technologies, each virtualization layer may include two sublayers: a read-only sublayer and a writable sublayer. An example of a virtualization technology that utilizes read-only and read-write sublayers is SYMANTEC's SOFTWARE VIRTUALIZATION SOLUTION (SVS).

A read-only sublayer may include an immutable base state of an application. In some embodiments, users may not—even unintentionally—make changes to the read-only sublayer. For example, in SVS, only administrators may be able to edit, update, and/or delete the contents of read-only sublayers. An application may be reset by deleting the existing read-only sublayer and replacing it with a new read-only sublayer.

A read-write (i.e., writeable) sublayer may capture changes to a base state of an application. For example, when a user alters an application by changing default preferences, these changes may be written to the read-write sublayer.

Virtualized applications that include read-only sublayers and read-write sublayers may be created in any suitable manner. For example, SVS may allow a user to specify a setup program for an application the user wants to capture for purposes of virtualizing the application. SVS may launch the setup program and capture all of the applications, files, and processes, including child processes and process-induced changes, in a single Virtual Software Package (VSP). SVS may also capture MICROSOFT installer (MSI) and service control manager changes. When the setup process is complete, SVS may automatically stop the capture process. An administrator may then edit the VSP to include settings that the administrator wants to distribute to users.

Figure 6:
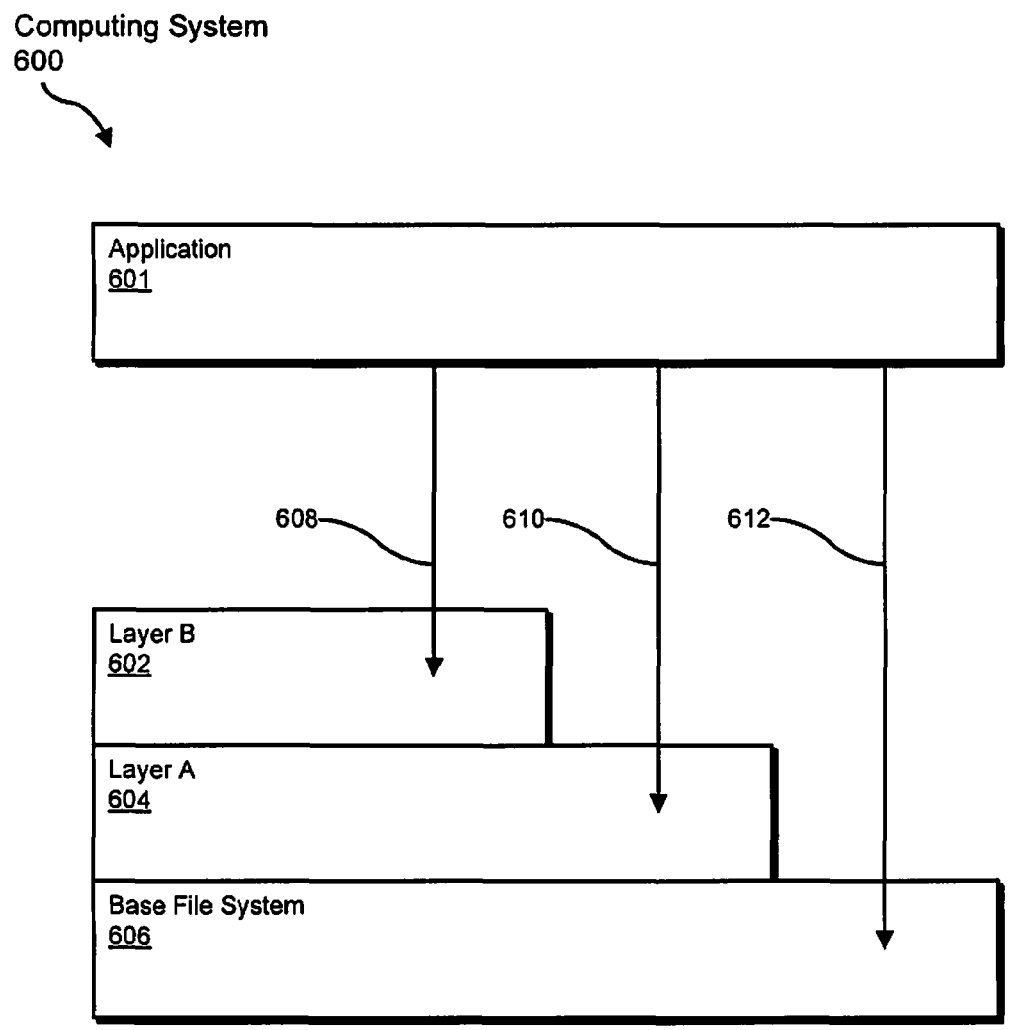
FIG. 6 is a block diagram showing virtualization layer prioritization according to certain embodiments.

FIG. 6 shows the operation of a computing system 600 with multiple virtualization layers. FIG. 6 illustrates an application 601, which may be a first and/or second version of an application. One or more files associated with application 601 may be located on virtualization layer B 602 and/or virtualization layer A 604. Virtualization layer B 602 may have priority over virtualization layer A 604, which in turn may have priority over a base file system 606. Application 601 may operate as follows. A first file access 608 may be made by application 601. A virtualization system may first search in layer B 602 for the requested file. Layer B 602 may include an entry for file access 608, and the corresponding file in layer B 602 may be returned to the application. Since layer B 602 has priority over layer A 604 and base file system 606, even if layer A 604 and base file system 606 have entries that correspond to file access 608, the virtualization system will return the entry from layer B 602.

Application 601 may make another file access 610. The virtualization system may not find a corresponding entry in layer B 602, but may find an entry in layer A 604. A third file access request 612 may not have a corresponding entry in layer B 602 or layer A 604, and the virtualization system may therefore return an entry from base file system 606.

Figure 7:
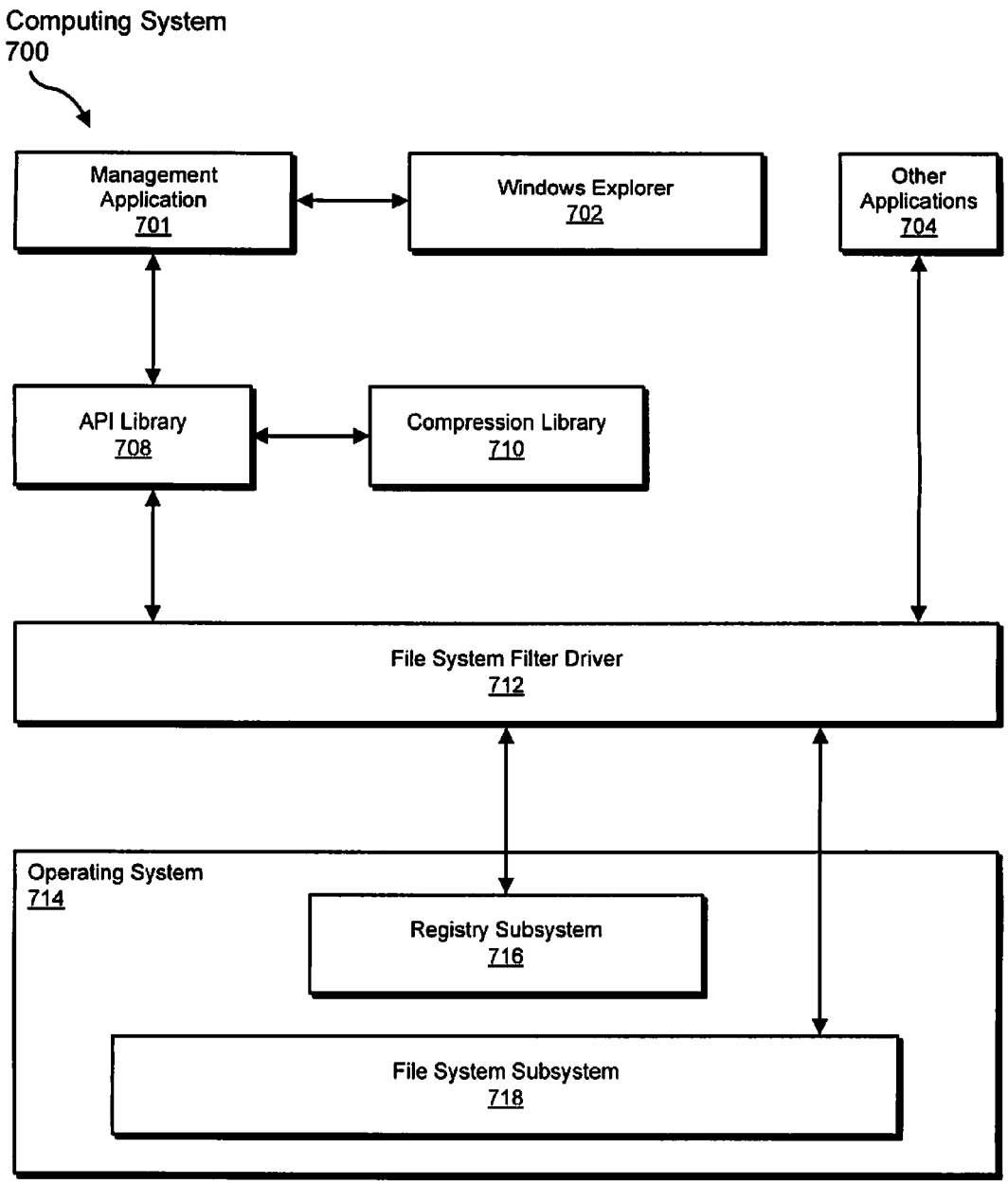
FIG. 7 is a block diagram of components of a computing system that includes virtualization layers according to certain embodiments.

FIG. 7 shows an example of a computing system 700 with a virtualization layer installed. The computing system may include an operating system 714. Operating system 714 may include a registry subsystem 716 and a file system subsystem 718. A file system filter driver 712 may be installed on operating system 714 and may have first processing priority for registry and file system accesses. A management application 701 may provide an administrator with an interface to interact with file system filter driver 712 and make changes to layers. An API library 708 may provide a convenient interface for management application 701 to interface with file system file driver 712.

Management application 701 may provide notices to a WINDOWS EXPLORER 702 indicating that the contents of a mounted file system have been changed. Other applications 704 may interact with the system, performing read and write operations to the file system and registry through file system filter driver 712. A compression library 710 may be provided to compress layer information.

File system filter driver 712 may store components of each layer and sublayer in one of two redirect areas (i.e. areas to which it redirects system calls). For example, file system filer driver 712 may store registry settings and attributes in a registry subsystem 716 and may store files in a file system subsystem 718.

In each sublayer's registry redirection area, file system filter driver 712 may store information about the state of the layer to which the sublayer belongs. File system filter driver 712 may also store references to the sublayer's file redirection area, reference counts, and sub-keys that—through a service control manager—may enable it to handle duplicate services running in multiple layers. In addition, file system filter driver 712 may store references to registry keys that contain user identity information, data-layer specifications, a sub-key for information about exclude entries, and a list of variables that govern the location of layer-specific files. As the name suggests, exclude entries may define application files and processes that a user may want to exclude from layers.

In the root of the file redirection area, file system filter driver 712 may store variable entries that abstract operating system specific file locations to enable users to deploy Virtual Software Archives (VSAs) on computers running various types of operating systems. When file system filter driver 712 is loaded on a user's computer, file system filter driver 712 may determine values for user and system variables.

File system filter driver 712 may store files that comprise sublayers and numbered folders under a file-redirection-area directory. File system filter driver 712 may use registry and file redirection areas to present to an operating system—and by extension, applications and users—with an aggregate view of virtualized files and data.

For example, a user may launch WINDOWS EXPLORER to view the contents of a program file folder. The user's machine may be running a virtualized application, such as MOZILLA FIREFOX, and the FIREFOX layer may be active. File system filter driver 712 may intercept EXPLORER's calls to the file system. From the base, which may include all files, settings, and processes that do not reside in layers on the user's machine, file system filter driver 712 may gather a list of non-virtualized applications that reside in the program files folder. File system filter driver 712 may also redirect Explorer's calls to include FIREFOX, which would normally reside in the program files folder but which, in this case, resides in the file redirection area. File system filter driver 712 may then respond to EXPLORER's calls with a complete list of folders that the system expects to see in the program files directory, including FIREFOX. In this example, if the FIREFOX layer were deactivated, file system filter driver 712 would obscure its existence.

Figure 8:
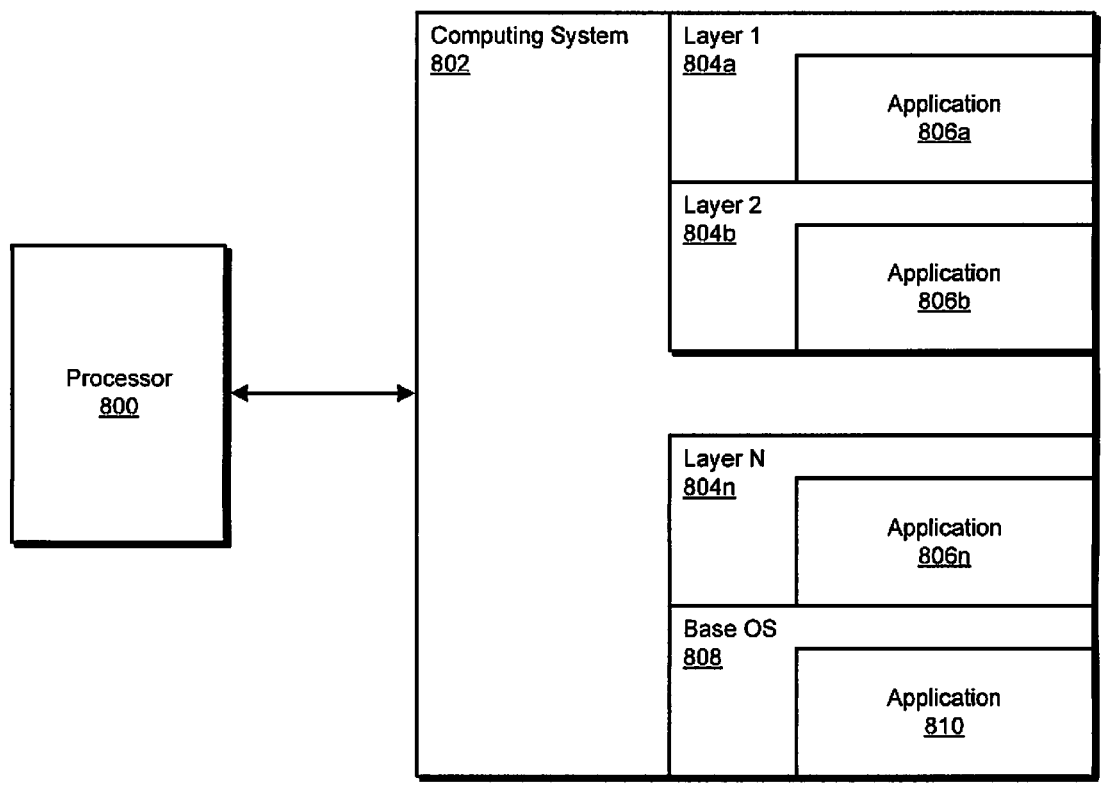
FIG. 8 is a block diagram showing organization of virtualization layers on a computing system according to certain embodiments.

FIG. 8 illustrates an example of a computing system 802 that includes virtualized applications 806a-n. Computing system 802 may contain a number of layers 804a-n. Applications 806a-n may be installed on layers 804a-n, respectively. As referred to herein, a layer (or virtualization layer) may refer to a set of file system and registry changes that may be managed by application virtualization software. In some embodiments, a layer may contain changes to one or more file systems but may not contain registry changes.

A layer may isolate an application from a base file system and may include files and a directory structure of the application's installation. The application files and directories may be shadowed or overlaid over the regular file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

A software application installed in a virtualization layer may be an application in any commonly used meaning, including word processors, browsers, system tools, games, and the like, and the principles described herein may also extend to any other software installed on a computing system.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, determining, using, creating, copying, deploying, comparing, compressing, and receiving steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as identifying, determining, using, creating, copying, deploying, comparing, compressing, and receiving.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for identifying, determining, using, creating, copying, deploying, comparing, compressing, and receiving steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, determining, using, creating, copying, deploying, comparing, compressing, and receiving steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, determining, using, creating, copying, deploying, comparing, compressing, and receiving steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Storage devices 932 and 933 may also be used, for example, to perform and/or be a means for performing, either alone or in combination with other elements, one or more of the identifying, identifying, determining, using, creating, copying, deploying, comparing, compressing, and receiving steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, determining, using, creating, copying, deploying, comparing, compressing, and receiving steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, a computing system (e.g., computing system 910 and/or one or more of the components of network architecture 1000) may perform a computer-implemented method or creating and/or applying a patch for a virtualized application. The computing system may identify a first version of the virtualized application. The first version of the virtualized application may include a first read-only virtualization sublayer. The first read-only virtualization sublayer may include a base state of the first version of the virtualized application. The computing system may also identify a second version of the virtualized application. The second version of the virtualized application may include a second read-only virtualization sublayer. The second read-only virtualization sublayer may include a base state of the second version of the virtualized application. The computing system may determine the difference between the first read-only virtualization sublayer and the second read-only virtualization sublayer and may then use the difference to create a patch configured to update an instance of the first version of the virtualized application to an instance of the second version of the virtualized application.

The computing system may also use the patch to update the instance of the first version of the virtualized application to the instance of the second version of the virtualized application. In some embodiments, the computing system may identify a virtualization layer where the instance of the first version of the virtualized application is installed. In such embodiments, using the patch to update the instance of the first version of the virtualized application may include using the patch to modify a read-only sublayer of the virtualization layer.

According to various embodiments, the computing system may identify a first virtualization layer where the instance of the first version of the virtualized application is installed. The computing system may also create a second virtualization layer and copy at least one file from a read-only sublayer of the first virtualization layer to a read-only sublayer of the second virtualization layer. In such embodiments, using the patch to update an instance of the first version of the virtualized application may include using the patch to modify the read-only sublayer of the second virtualization layer.

According to at least one embodiment, the computing system may deploy the patch to a remote computing system. The remote computing system may include the instance of the first version of the virtualized application. The remote computing system may use the patch to update the instance of the first version of the virtualized application to the instance of the second version of the virtualized application.

In some embodiments, determining the difference between the first read-only virtualization sublayer and the second read-only virtualization sublayer may include comparing files stored in the first read-only virtualization sublayer with files stored in the second read-only virtualization sublayer. In certain embodiments, determining the difference between the first read-only virtualization sublayer and the second read-only virtualization sublayer may include determining a difference between a registry area associated with the first version of the virtualized application and a registry area associated with the second version of the virtualized application.

In certain embodiments, the difference between the first read-only virtualization sublayer and the second read-only virtualization sublayer may include a binary differential between the first read-only virtualization sublayer and the second read-only virtualization sublayer. According to various embodiments, using the difference to create a patch for the first version of the virtualized application may include compressing the difference into a virtual patch archive format. In various embodiments, the computing system may create the second version of the virtualized application by applying an update to the first version of the application.

According to at least one embodiment, the first version of the virtualized application may include a first read-write virtualization sublayer, and the first read-write virtualization sublayer may be configured to store changes to the base state of the first version of virtualized application. The second version of the virtualized application may include a second read-write virtualization sublayer. The second read-write virtualization sublayer may be configured to store changes to the base state of the second version of the virtualized application.

According to certain embodiments, a computing system may receive a patch comprising a difference between a read-only virtualization sublayer of a first version of a virtualized application and a read-only virtualization sublayer of a second version of the virtualized application. The computing system may identify a virtualization layer where an instance of the first version of the virtualized application is installed. The computing system may use the patch to update the instance of the first version of virtualized application to the instance of the second version of the virtualized application.

In at least one embodiment, the computing system may identify a virtualization layer where the instance of the first version of the virtualized application is installed. In such embodiments, using the patch to update the instance of the first version of the virtualized application may include using the patch to modify a read-only sublayer of the virtualization layer. In other embodiments, the computing system may identify a first virtualization layer where the instance of the first version of the virtualized application is installed. The computing system may create a second virtualization layer and copy at least one file from a read-only sublayer of the first virtualization layer to a read-only sublayer of the second virtualization layer. In such embodiments, using the patch to update the instance of the first version of the virtualized application may include using the patch to modify the read-only sublayer of the second virtualization layer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
   identifying a first version of a virtualized application comprising a first read-only virtualization sublayer, the first read-only virtualization sublayer comprising a base state of the first version of the virtualized application;
   identifying a second version of the virtualized application comprising a second read-only virtualization sublayer, the second read-only virtualization sublayer comprising a base state of the second version of the virtualized application;
   determining a difference between the first read-only virtualization sublayer and the second read-only virtualization sublayer;

using the difference to create a patch configured to update an instance of the first version of the virtualized application to an instance of the second version of the virtualized application.

2. The computer-implemented method of claim 1, further comprising using the patch to update the instance of the first version of the virtualized application to the instance of the second version of the virtualized application.

3. The computer-implemented method of claim 2, further comprising identifying a virtualization layer where the instance of the first version of the virtualized application is installed, wherein using the patch to update the instance of the first version of the virtualized application comprises using the patch to modify a read-only sublayer of the virtualization layer.

4. The computer-implemented method of claim 2, further comprising:
identifying a first virtualization layer where the instance of the first version of the virtualized application is installed;
creating a second virtualization layer;
copying at least one file from a read-only sublayer of the first virtualization layer to a read-only sublayer of the second virtualization layer, wherein using the patch to update the instance of the first version of the virtualized application comprises using the patch to modify the read-only sublayer of the second virtualization layer.

5. The computer-implemented method of claim 1, further comprising:
deploying the patch to a remote computing device, the remote computing device comprising the instance of the first version of the virtualized application;
using the patch to update the instance of the first version of the virtualized application to the instance of the second version of the virtualized application.

6. The computer-implemented method of claim 1, wherein determining the difference between the first read-only virtualization sublayer and the second read-only virtualization sublayer comprises comparing files stored in the first read-only virtualization sublayer with files stored in the second read-only virtualization sublayer.

7. The computer-implemented method of claim 1, wherein determining the difference between the first read-only virtualization sublayer and the second read-only virtualization sublayer comprises determining a difference between a registry redirection area associated with the first version of the virtualized application and a registry redirection area associated with the second version of the virtualized application.

8. The computer-implemented method of claim 1, wherein the difference between the first read-only virtualization sublayer and the second read-only virtualization sublayer comprises a binary differential between the first read-only virtualization sublayer and the second read-only virtualization sublayer.

9. The computer-implemented method of claim 1, wherein using the difference to create a patch for the first version of the virtualized application comprises compressing the difference into a virtual patch archive format.

10. The computer-implemented method of claim 1, further comprising creating the second version of the virtualized application by applying an update to the first version of the virtualized application.

11. The computer-implemented method of claim 1, wherein:
the first version of the virtualized application comprises a first read-write virtualization sublayer;
the first read-write virtualization sublayer is configured to store changes to the base state of the first version of the virtualized application;
the second version of the virtualized application comprises a second read-write virtualization sublayer;
the second read-write virtualization sublayer is configured to store changes to the base state of the second version of the virtualized application.

12. The computer-implemented method of claim 1, tangibly embodied as computer-executable instructions on at least one computer-readable medium.

13. A computer-implemented method comprising:
receiving a patch, the patch comprising a difference between a read-only virtualization sublayer of a first version of a virtualized application and a read-only virtualization sublayer of a second version of the virtualized application;
identifying a virtualization layer where an instance of the first version of the virtualized application is installed;
using the patch to update the instance of the first version of the virtualized application to an instance of the second version of the virtualized application.

14. The computer-implemented method of claim 13, further comprising identifying a virtualization layer where the instance of the first version of the virtualized application is installed, wherein using the patch to update the instance of the first version of the virtualized application comprises using the patch to modify a read-only sublayer of the virtualization layer.

15. The computer-implemented method of claim 13, further comprising:
identifying a first virtualization layer where the instance of the first version of the virtualized application is installed;
creating a second virtualization layer;
copying at least one file from a read-only sublayer of the first virtualization layer to a read-only sublayer of the second virtualization layer, wherein using the patch to update the instance of the first version of the virtualized application comprises using the patch to modify the read-only sublayer of the second virtualization layer.

16. The computer-implemented method of claim 13, tangibly embodied as computer-executable instructions on at least one computer-readable medium.

17. A system comprising:
a patch-creation module programmed to:
identify a first version of a virtualized application comprising a first read-only virtualization sublayer, the first read-only virtualization sublayer comprising a base state of the first version of the virtualized application;
identify a second version of the virtualized application comprising a second read-only virtualization sublayer, the second read-only virtualization sublayer comprising a base state of the second version of the virtualized application;
determining a difference between the first read-only virtualization sublayer and the second read-only virtualization sublayer;
using the difference to create a patch configured to update an instance of the first version of the virtualized application to an instance of the second version of the virtualized application;
a deployment module programmed to deploy the patch to a remote computing device, the remote computing device comprising the instance of the first version of the virtualized application;

a processor configured to execute the patch-creation module and the deployment module;

a network adapter configured to send the patch to the remote computing device in response to a request from the deployment module.

18. The system of claim 17, wherein the patch-creation module is programmed to:

determine a difference between a registry redirection area associated with the first version of the virtualized application and a registry redirection area associated with the second version of the virtualized application;

determine a difference between a file redirection area associated with the first version of the virtualized application and a file redirection area associated with the second version of the virtualized application.

19. The system of claim 17, wherein the difference between the first read-only virtualization sublayer and the second read-only virtualization sublayer comprises a binary differential between the first read-only virtualization sublayer and the second read-only virtualization sublayer.

20. The system of claim 17, further comprising an application module programmed to:

receive the patch from the deployment module;

use the patch to update the instance of the first version of the virtualized application to the instance of the second version of the virtualized application.

* * * * *